May 14, 1946.    N. E. BROOKE    2,400,284
GRASS AND WEED CUTTER
Filed July 14, 1944
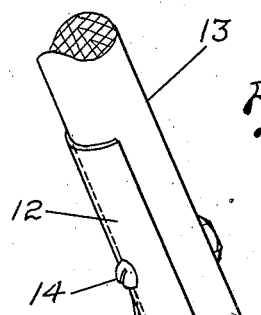
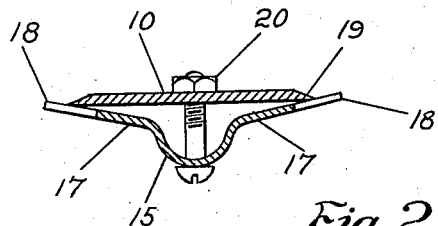
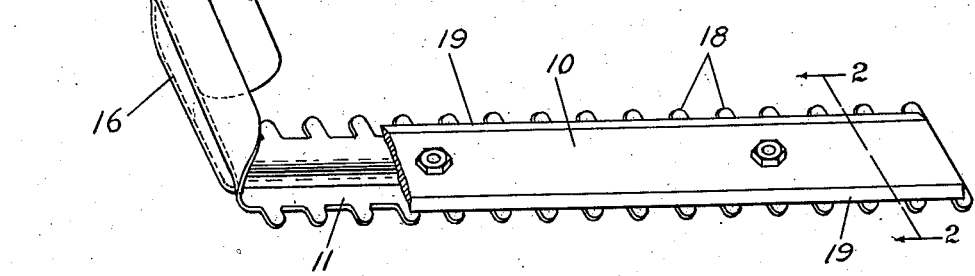
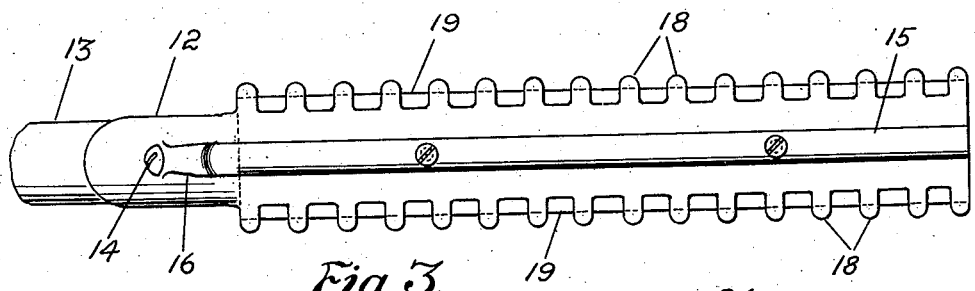
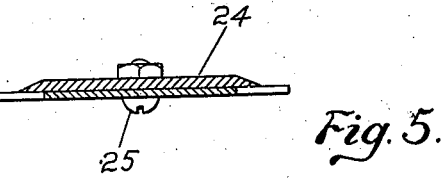
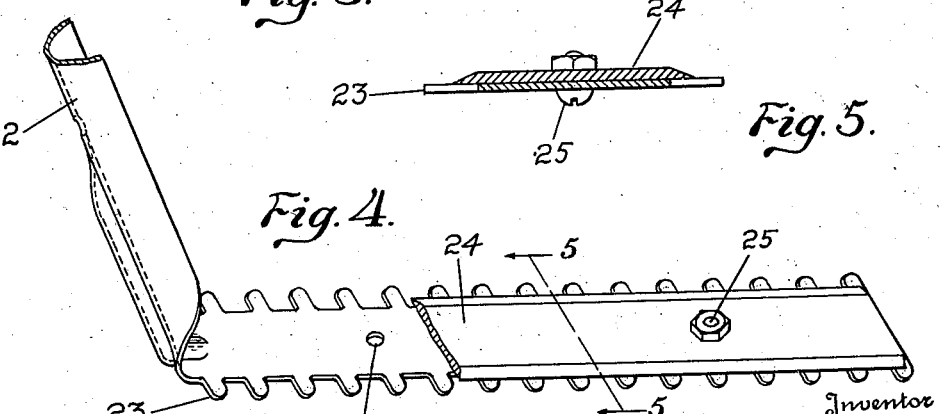
Inventor
Norman E. Brooke
By Wilfred E. Lawson
Attorney Patented May 14, 1946

2,400,284

UNITED STATES PATENT OFFICE 2,400,284

GRASS AND WEED CUTTER

Norman E. Brooke, Washington, D. C.

Application July 14, 1944, Serial No. 544,975

6 Claims. (Cl. 30—318)

This invention relates to weed cutting implements and pertains particularly to implements of the class comprising a head and a handle attached thereto, to be swung in a manner similar to a golf club.

A particular object of the present invention is to provide a grass and weed cutting implement of the above described class, wherein the cutting blade forms a separable unit from a supporting or carrying guard member and wherein such guard member is pressed or shaped from a single sheet of material integrally with a shank portion which is formed to have a handle secured thereto, the design and construction of the guard being such that it may be formed rigidly from a relatively light or thin piece of material.

Another object of the invention is to provide a weed and grass cutter of the character stated, wherein the guard associated with the cutting blade is formed in a novel manner whereby the edges of the blade will be held in close contact with protecting guard fingers forming a part of the guard, when the blade and guard are secured together.

Still another object of the invention is to provide a weed and grass cutter of the character stated, comprising a relatively long guard member having guard teeth formed along each longitudinal edge and pressed or shaped integrally with an obliquely extending shank at one end which is formed to receive a handle, and a cutting blade adapted to position lengthwise of the guard to be secured thereto either against the upper side or against the lower side as may be found most desirable.

Other objects and advantages of the invention will become apparent as the description of the same proceeds and the invention will be best understood from a consideration of the following detailed description taken with the accompanying drawing forming a part of the specification, with the understanding, however, that the invention is not confined to a strict conformity with the showing of the drawing but may be changed or modified so long as such changes or modifications are within the scope of the appended claims.

In the drawing:

Figure 1 is a view in perspective of the implement of the present invention, a portion of the blade being broken away.

Figure 2 is a transverse section, on an enlarged scale, taken on the line 2—2 of Figure 1.

Figure 3 is a bottom plan view.

Figure 4 is a view in perspective of a modified form of the implement, partly broken away.

Figure 5 is a transverse section on the line 5—5 of Figure 4.

Figure 6 is a view corresponding to Figure 5, but showing the blade positioned upon the underside of the guard.

Referring now more particularly to the drawing and especially to Figures 1 to 3, it will be seen that the present implement consists essentially of two principal parts which comprise a blade which is generally designated 10 and a guard plate which is generally designated 11.

The guard plate 11 is cut or shaped from a single piece of material of suitable weight and length and has a portion of one end bent to form an oblique angle with respect thereto and also to form a substantially semi-circular shank 12, the open side of which is directed forwardly and is designed to receive an end of a handle 13. This handle is secured to the shank 12 by means of the nut and bolt assembly 14 as shown.

In accordance with the present invention, the guard plate 11 is pressed to have the downwardly projecting longitudinally extending rib 15 which is formed on the longitudinal center of the plate and this rib is continued around the angle between the plate and the shank to extend part way through the length of the shank as indicated at 16.

By forming the down-pressed guard rib 15 upon the longitudinal center of the guard plate, the plate is divided longitudinally into the two side or wing portions 17 and these portions extend at a slight inclination upwardly from the rib as shown in Figure 2.

The longitudinal edges of the two portions 17 are provided with the outwardly directed guard fingers 18 which fingers are engaged by the sharpened edges 19 of the cutting blade 10, between their ends.

Thus it will be seen that the edges of the blade 10 extend outwardly beyond the edge portions of the guard plate 11 lying between the fingers 18 so that the portions of the cutting blade edges lying over the spaces between the fingers are free for engagement with the stalks of grasses and weeds.

The cutting blade 10 is secured to the top of the guard plate by nut and bolt assemblies 20 as shown, the bolt of each assembly extending through the rib 15. Thus it will be seen that the cutting plate engages the guard plate only at the cutting edges and, since the guard plate material would have a degree of resiliency, when the securing assemblies 20 are drawn up tightly the guard plate will be centrally flexed so as to bring the edges of the cutting blade into firm contact with the fingers 18.

The down-pressed rib 15 of the guard plate 5 serves the double function of strengthening or stiffening the plate and of providing a foot for the plate which serves to maintain the plate slightly spaced above the ground when the device is in use so that the possibility of driving the fingers against the ground is not so great as would be the case if the guard plate were perfectly flat.

The cutting blade 10 is sharpened by being beveled upon one side only, the bevel being upon the upper side when the blade is in position on the guard plate as shown in Figure 2 and consequently, no space is left between the cutting edge and the fingers against which they bear.

In the embodiment of the invention illustrated in Figures 4 to 6, the guard plate which is generally designated 21 is also formed from a single piece of material with the shank portion 22 which extends upwardly at an oblique angle from one end of the guard plate and which is transversely curved as shown to receive a handle. This guard plate 21 is also provided along each of its two longitudinal edges with the guard fingers 23, the same being suitably spaced apart. However, the plate 21 is made flat and without the central longitudinal rib, as shown in Figure 4, which construction allows for the application of the cutting blade which is generally designated 24, to either the top side of the guard plate or to the under or bottom side thereof as may be found most desirable.

The cutting blade 24 is of the same construction as the blade shown in the preceding figures and designated 10 and when in working position upon either the top or the under side of the guard plate 21, the blade may be positioned with the bevel 25 of the edges, lying away from the guard plate or near the same as may be found most desirable.

As will, of course, be readily understood if the cutting blade is placed against the guard plate 21 with the bevel of each cutting edge adjacent to the guard plate, the edges will be spaced from the fingers 23 so that while possibly some advantage in cutting action may be obtained they will be more likely to be damaged and blunted than would be the case if the blade were placed with the bevel away from the guard plate as shown in Figure 4.

As will be seen from the foregoing, the construction of the implement in both of its embodiments is such that the guard plate and shank may be formed of relatively light metal but will be strengthened and made rigid in the one case by the provision of the integral pressed rib 15 and in the other case by the close contact of the cutting blade with the guard plate and the manner of securing these two elements firmly together by the nut and bolt assemblies 25.

I claim:

1. A cutting implement of the character stated, comprising a relatively long plate having a portion of one end bent to extend at an angle to provide a shank having a substantially semi-circular cross section for the reception of a handle, said plate having teeth formed along each of its longitudinal edges, and a cutting blade of a length substantially equal to the length of the plate and designed to be positioned against a side of the plate, the cutting blade having its two longitudinal edges sharpened, the over-all width of the cutting blade being greater than the distance between the side edges of the plate between the teeth, and means for detachably securing the blade and plate together.

2. A cutting implement as set forth in claim 1, in which said cutting blade has its longitudinal edges sharpened by a single bevel formed upon one side of the blade, the bevels of the two edges being upon the same side of the blade, and the blade being adapted to be positioned against the plate in either of two positions in which the bevels are adjacent to or away from the plate.

3. A cutting implement of the character stated in claim 1, in which said guard plate is pressed to have a central longitudinally extending rib projecting downwardly from the under side thereof.

4. A cutting implement of the character stated in claim 1, in which the guard plate is pressed to have a central longitudinally extending rib projecting downwardly from the under side thereof and said rib being continued into and part-way through the length of the shank.

5. A cutting implement as set forth in claim 1, in which the guard plate is centrally longitudinally bent to provide two side portions, said side portions being disposed at a slight upward inclination, the cutting blade contacting the guard plate only adjacent the sharpened edges, the said inclined portions functioning as a resilient means for maintaining a tight contact between the blade and guard plate when the blade and plate are secured together.

6. A cutting implement of the character stated, comprising a relatively long flat guard plate having a portion of one end bent to provide an obliquely extending shank, the shank being transversely arcuate to receive a handle, the guard plate having a series of teeth formed along each longitudinal edge, a cutting blade of a length substantially equal to that of the guard plate and designed to be positioned against either the top or the bottom side of the guard plate, the longitudinal edges of the blade being sharpened and the over-all width of the blade being slightly greater than the width of the guard plate between the teeth, and means for securing the blade to and flat against a side of the guard plate.

NORMAN E. BROOKE.